(12) United States Patent
Leinonen et al.

(10) Patent No.: US 8,989,677 B2
(45) Date of Patent: Mar. 24, 2015

(54) APPARATUS AND METHOD FOR SWITCHING FROM RECEPTION TO TRANSMISSION

(75) Inventors: Marko Eero Tapani Leinonen, Haukipudas (FI); Seppo Olavi Rousu, Oulu (FI); Juha Pentti Tapio Valtanen, Oulu (FI)

(73) Assignee: Nokia Corporation, Espoo (FI)

( * ) Notice: Subject to any disclaimer, the term of this patent is extended or adjusted under 35 U.S.C. 154(b) by 340 days.

(21) Appl. No.: 12/810,937

(22) PCT Filed: Dec. 22, 2008

(86) PCT No.: PCT/FI2008/050780
§ 371 (c)(1),
(2), (4) Date: Jun. 28, 2010

(87) PCT Pub. No.: WO2009/083647
PCT Pub. Date: Jul. 9, 2009

(65) Prior Publication Data
US 2011/0045786 A1 Feb. 24, 2011

(30) Foreign Application Priority Data
Dec. 28, 2007 (FI) ...................................... 20075974

(51) Int. Cl.
*H04B 1/44* (2006.01)
*H01Q 3/24* (2006.01)
(Continued)

(52) U.S. Cl.
CPC ................ *H01Q 3/24* (2013.01); *H01Q 21/28* (2013.01); *H04B 1/0064* (2013.01); *H04B 7/0842* (2013.01)
USPC ....... 455/78; 455/550.1; 455/277.1; 455/522; 455/562.1

(58) Field of Classification Search
CPC .... H04B 7/086; H04B 7/0848; H04B 7/0808; H04B 7/0602; H04B 7/0814; H04B 7/0615; H04B 7/0697; H04B 1/38; H04B 7/022; H04B 7/0413; H04B 7/0452; H04B 7/061; H04B 7/0634; H04B 1/005; H04B 7/0632; H04B 7/0682; H04W 72/02; H04W 16/28; H04W 24/00; H04W 40/00; H04W 48/12; H04W 52/08; H04W 56/0015; H04W 92/12
USPC ............... 455/69, 101, 277.1, 277.2, 283, 78, 455/81–83, 129, 140, 269, 63.4; 370/205, 370/436, 230.1, 280, 281, 347, 316, 310, 370/328, 334, 335, 337, 342; 375/219, 222, 375/239, 260, 264, 279, 308, 299, 324, 332
See application file for complete search history.

(56) References Cited

U.S. PATENT DOCUMENTS 5,799,245 A * 8/1998 Ohashi ............................ 455/69
6,009,316 A * 12/1999 Tsuji ........................... 455/277.1
(Continued)

FOREIGN PATENT DOCUMENTS

| CN | 1705258 A | 12/2005 |
|---|---|---|
| CN | 1781267 A | 5/2006 |

(Continued)

OTHER PUBLICATIONS

International Search Report and Written Opinion of the International Searching Authority for PCT Application No. PCT/FI2008/050780, dated Apr. 28, 2009, 15 pages.
(Continued)

*Primary Examiner* — Golam Sorowar
(74) *Attorney, Agent, or Firm* — Squire Patton Boggs (US) LLP

(57) ABSTRACT

The invention is related to an apparatus comprising: at least one definition unit configured to define signal characterizing parameters of a transmission; and at least one routing unit configured to route the transmission to at least one transmission path based on the signal characterizing parameters, the at least one transmission path arranged to convey the transmission to at least one antenna.

17 Claims, 7 Drawing Sheets

(51) Int. Cl.
*H01Q 21/28* (2006.01)
*H04B 1/00* (2006.01)
*H04B 7/08* (2006.01)

(56) References Cited

U.S. PATENT DOCUMENTS

| | | | |
|---|---|---|---|
| 6,563,883 | B1 | 5/2003 | Leinonen et al. |
| 6,600,933 | B1 * | 7/2003 | Hiramatsu et al. ............ 455/561 |
| 6,826,391 | B2 | 11/2004 | Leinonen et al. |
| 7,113,752 | B2 | 9/2006 | Leinonen et al. |
| 7,245,950 | B2 * | 7/2007 | Iwai et al. .................. 455/575.7 |
| 2003/0176176 | A1 | 9/2003 | Leinonen et al. |
| 2004/0009782 | A1 * | 1/2004 | Shimizu ........................ 455/522 |
| 2004/0219959 | A1 | 11/2004 | Khayrallah et al. |
| 2005/0272384 | A1 | 12/2005 | Kogure |
| 2005/0277387 | A1 * | 12/2005 | Kojima et al. .................. 455/78 |
| 2006/0197538 | A1 | 9/2006 | Leinonen et al. |
| 2007/0213015 | A1 * | 9/2007 | Nagano et al. .................. 455/83 |

FOREIGN PATENT DOCUMENTS

| | | |
|---|---|---|
| EP | 0771082 B1 | 4/2003 |
| EP | 1083622 A2 | 8/2005 |
| EP | 1848118 A2 | 10/2007 |
| GB | 2428917 B | 9/2007 |

OTHER PUBLICATIONS

Office Action issued on Sep. 20, 2012 by the State Intellectual Property Office in Chinese Patent Application No. 200880123329.X, 10 pages.
Chinese Office Action for corresponding Chinese Application No. 200880123329.X, dated May 16, 2013.
Chinese Office Action, with English translation, dated Nov. 13, 2013, for corresponding Chinese Application No. 200880123329.X.
Chinese Office Action dated May 30, 2014, for corresponding Chinese Patent Application No. 200880123329.X.

* cited by examiner

APPARATUS AND METHOD FOR SWITCHING FROM RECEPTION TO TRANSMISSION

RELATED APPLICATION

This application was originally filed as PCT Application No. PCT/FI2008/050780 on 22 December, 2008 and claims priority to Finnish Application No. 20075974 filed on Dec. 28, 2007, which is incorporated herein by reference in its entirety.

FIELD

The invention relates to apparatuses, a control logic processor and method.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

An antenna is a transducer designed to transmit or receive radio waves. Antennas are used in, for example, radio and television broadcasting, point-to-point radio communication, Wireless Local Area Networks, etc.

Nowadays, most radio devices are designed to support a two-way radio communication. That is to say they have both transmission and reception antennas. Additionally, in many radio devices, to improve the quality of a reception, a plurality of reception and/or transmission antennas are provided.

Typically, signals are not received and transmitted simultaneously to and from the same device all the time. On the other hand for instance if radio circumstances are good, all existing antennas are not necessarily needed for reception or transmission. Due to this fact, some of the antennas may be idle for long periods of time.

BRIEF DESCRIPTION

According to an aspect of the present invention, there is provided an apparatus comprising a control logic, the control logic configured to: generate a switching decision for changing usage of at least one antenna from reception to transmission; and change usage of at least one antenna responsive to the generated switching decision.

According to an aspect of the present invention, there is provided a control logic processor comprising circuitry configured to generate a switching decision and to change usage of at least one antenna from reception to transmission responsive to the switching decision.

According to another aspect of the present invention, there is provided a communication device comprising: a number of antennas; and control logic configured to change usage of at least one antenna from reception to transmission responsive to a switching decision.

According to another aspect of the present invention, there is provided a method comprising: generating a switching decision for changing usage of at least one antenna from reception to transmission by a control logic; and changing usage of at least one antenna responsive to the generated switching decision by the control logic.

According to another aspect of the present invention, there is provided an apparatus comprising: means for changing usage of at least one antenna from reception to transmission responsive to a switching decision.

LIST OF DRAWINGS

Embodiments of the present invention are described below, by way of example only, with reference to the accompanying drawings, in which FIG. 1 shows an example of a communication system;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any user terminal, server, corresponding component, and/or to any communication system or any combination of different communication systems that support required functionality. The used protocols, the specifications of communication systems, servers and user terminals, especially in wireless communication, develop rapidly. Therefore, all words and expressions should be interpreted broadly and they are intended to illustrate, not to restrict, the embodiment.

In the following, different embodiments will be described using, as an example of a system architecture whereto the embodiments may be applied, an architecture based on Universal Mobile Telecommunications System (UMTS) without restricting the embodiment to such architecture, however.

Many different radio protocols to be used in communications systems exist. Some examples of different communication systems are the Universal Mobile Telecommunications System (UMTS) radio access network (UTRAN), Global System for Mobile Communications (GSM) and its modifications, Long Term Evolution (LTE), Wireless Local Area Network (WLAN), Worldwide Interoperability for Microwave Access (WiMAX), Bluetooth®, Personal Communications Services (PCS) and systems using ultra-wideband (UWB) technology.

Figure 1:
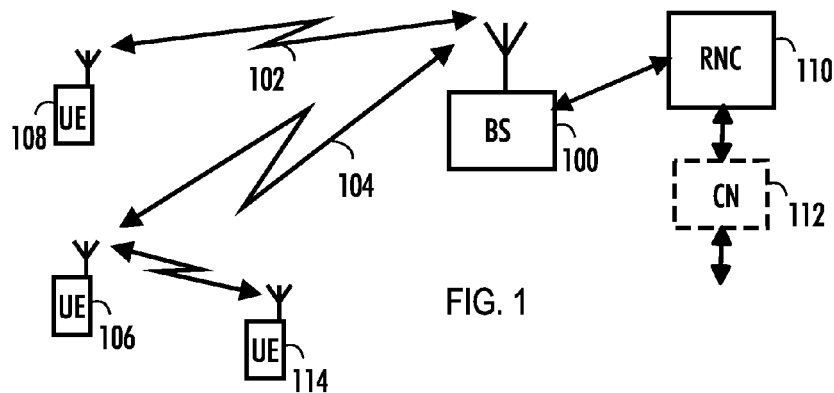

FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for group communication, are irrelevant to the actual invention. Therefore, they need not to be discussed in more detail here.

FIG. 1 shows a part of a UMTS radio access network (UTRAN). UTRAN is a radio access network which includes wideband code division multiple access (WCDMA) technology.

The communications system is a cellular radio system which comprises a base station (or node B) 100, which has bi-directional radio links 102 and 104 to user devices 106 and 108. The user devices may be fixed, vehicle-mounted or portable. The user devices 106 and 108 may refer to portable computing devices. Such computing devices include wireless mobile communication devices operating with or without a subscriber identification module (SIM), including, but not limited to, the following types of devices: mobile phone, multimedia computer, personal digital assistant (PDA), handset, wireless data router.

The base station includes transceivers, for instance. From the transceivers of the base station, a connection is provided to an antenna unit that establishes bi-directional radio links to the user devices. The base station is further connected to a controller 110, a radio network controller (RNC), which transmits the connections of the devices to the other parts of the network. The radio network controller controls in a centralized manner several base stations connected to it. The radio network controller is further connected to a core network 112 (CN). Depending on the system, the counterpart on the CN side can be a mobile services switching center (MSC), a media gateway (MGW) or a serving GPRS (general packet radio service) support node (SGSN), etc.

In FIG. 1, a communication link is performed between user devices 106 and 114. This kind of a communication link can be established with a short-range radio communication, such as Bluetooth or WLAN.

It should be noted that in future radio networks, the functionality of an RNC may be distributed among (possibly a subset of) base stations. The embodiments are not, however, restricted to the system given as an example but a person skilled in the art may apply the solution to other communication systems provided with the necessary properties. Different radio protocols may be used in the communication systems in which embodiments of the invention are applicable. The radio protocols used are not relevant regarding the embodiments of the invention.

The communication system is also able to communicate with other networks, such as a public switched telephone network or the Internet.

In this application, the term "apparatus" may mean a transceiver or a part of it, a user device or a network node, for instance.

An embodiment of the invention provides means for bypassing a power amplifier without a need for a signal-combining switch. A signal-combining switch is used in the arrangement of U.S. Pat. No. 6,563,883, wherein amplified signals and bypassed signals are combined to the same transmission path after the power amplifier. The linearity requirement is high for the signal-combining switch since both a high and low transmission powers have to be prevented from generating additional harmonics.

U.S. Pat. No. 7,113,752 discloses a method for securing the operation of a receiver in a two-way radio apparatus by enhancing the isolation between the transmitter and a receiver. In two-way radio systems the transmission and reception bands are usually relative close to one another. Therefore, special care has to be taken to prevent the transmission from interfering with the reception. In full-duplex systems, the transfer directions are traditionally separated by a duplex-filter coupled to an antenna shared by the transmission and the reception.

Further, U.S. Pat. No. 7,113,752 presents a method for transmission antenna matching. In the method, the strength of a field reflected from the antenna towards a power amplifier is measured. When the ratio of the strength of the reflected field to the strength of the propagating field is above a threshold, the filter of a filter bank having a greater stop-band attenuation in the reception band will be used as a transmission filter. The filter selection is used for limiting the noise level in a receiver.

U.S. Pat. No. 6,826,391 discloses that if a terminal has separate transmission and reception antennas, the transmission antenna is not in use at all times. Thus, the transmission antenna may be used as another reception antenna in the space diversity scheme. Transmission and reception in a frequency division duplex system are carried out at different frequencies, rendering the transmission antenna relatively ineffective at the reception frequencies. The transmission antenna, which is tuned for transmitting, may be tuned to a reception band at least part of the time when the transmission antenna is not used for transmission.

Diversity reception antennas may be used to improve data throughput rates in the changing radio channel environment. Diversity antennas may be individual resonance antennas, sub-band reception band resonance antennas, one or more split functionality antenna groups or an antenna array, where one antenna element may serve several frequency bands. If the diversity antenna is not covering the whole reception band the antenna resonance need to be tuned based on the reception frequency of the incoming signal. The main antenna can be implemented similar way.

In an embodiment, diversity reception antennas are used for transmission. Transmissions are routed to a diversity reception antenna in certain circumstances. A diversity reception antenna is converted to a transmission antenna depending on a power level of a signal to be transmitted.

By the routing, a transmission power amplifier can be bypassed and thus save current, which is important especially with battery equipped devices. The power amplifier may even be completely shut down when a transmission at a low power level is taken place. Thus, transmission power consumption may be optimized.

The transmission power of the transmitter is typically known and controlled by a control logic circuitry. The control logic circuitry may be implemented at least with an ASIC (Application Specific Integrated Circuit), DSP (Digital Signal Processor) processor or general-purpose computer processor. A controlling transmission power control algorithm is typically implemented with software commands included in the control logic circuitry. Actual transmission power, that is the power transmitted via antenna to a radio channel, can be monitored by a power detection circuitry from an antenna port of a main antenna and/or from an antenna port of a diversity reception antenna.

A power detection circuit may be implemented with a capacitor coupling or with a dedicated coupler element. One dedicated coupler element is a bi-directional coupler, which can monitor the transmission power which is delivered through the coupler element and/or reflected power from the antenna element.

In this application, a main antenna is also called as a first antenna. A second antenna may be any of the following: a diversity reception antenna supporting the same radio system than the first antenna, a diversity transmission antenna supporting the same radio system than the first antenna, a diversity transceiver antenna supporting the same system than the first antenna, an antenna comprising a plurality of antenna elements (such as an antenna array), an antenna arranged to operate in a different radio system than the first antenna, and an antenna arranged to operate at a different operational frequency than the first antenna.

When signals, having low transmission power levels, are routed to an alternative transmission path before a power amplifier, the power amplifier typically having 30 dB gain, the range of transmission power control (variable gain control amplifier) may be reduced, since the gain is not used at the end of a transmission chain.

Since the resonance quality of both a first antenna and at least one second antenna may be monitored by measuring the reflected power from the first antenna or from at least one second antenna, a transmission may be routed to either a main or a second antenna based on the information available by a power control algorithm and/or actual transmitted power, which may be obtained by monitoring. The transmission may be routed to the antenna which best fits current operational conditions of an electronic device and thus power radiated out from the device may be optimized.

In many communications systems transmission and reception may also take place at the same time. Then, typically, a duplex-filter is required for separating reception and transmission signals and also for combining a transmission signal with a reception signal into one antenna feed point. If a transmission is routed to a reception antenna only when its power level is low, requirements for attenuation of an alternative duplex-filter coupled to another antenna may be loosen compared with the requirements of a main antenna duplex filter, in the case an alternative duplex-filter is used for combining transmission and diversity reception signals. One possible implementation of a duplex-filter is a triplexer including three filters integrated in one component.

One of the most challenging parameters for a duplex-filter design is the isolation between transmission and reception ports. The challenge is caused by the fact that wide band noise generated during the generation of a transmission signal need to be at least attenuated to the level of thermal noise. If this is not achieved, other simultaneous transmissions will degrade the performance of the reception of the transmission signal. Isolation may also be needed for attenuating a transmission signal to a level tolerated by the receiver without receiver suppression.

If a transmission power is reduced, isolation requirements may be less strict which in turn reduces the insertion losses of reception and transmission filters.

Next, some embodiments are further explained by means of FIGS. 2 to 11. The Figures depict a part of a transmission and reception parts of an electronic device. It is obvious for a person skilled in the art that an electronic device may also include other parts than those depicted in the Figures. The Figures are only examples designed to clarify the embodiments of the invention, they are not meant to be limiting the applicability of the invention, for instance to illustrated communications systems.

Different embodiments may also be combined in a plurality of ways.

It should be noticed that the embodiments may also be implemented as one or more integrated circuits, such as application-specific integrated circuits ASIC. Other hardware embodiments are also feasible, such as a circuit built of separate logic components or with lumped elements. A hybrid of these different implementations is also feasible.

The embodiments may be implemented as a module or a part of a module, or as a chipset or part of a chipset.

Although the part of a transceiver has been depicted as one entity, different modules may be implemented in one or more physical or logical entities.

The embodiments may be placed at any node or a host which is able to serve a communications system, an example of such a device is a base station or user terminal.

The device may also be a user device which is a piece of equipment or a device that associates, or is arranged to associate, the user device and its user with a subscription and allows a user to interact with a communications system. The user device typically presents information to the user and allows the user to input information. In other words, the user device may be any device capable of receiving information from and/or transmitting information to the network, connectable to the network wirelessly or via a fixed connection. Examples of user devices include a personal computer or external device for e.g. personal computer, a game console, a laptop (a notebook), a personal digital assistant, a mobile station (mobile phone), and a line telephone.

In the following, some embodiments are further clarified by the means of Figures. It is obvious for a person skilled in the art that communications systems depicted in the Figures are only examples and they do not limit the adjustability of embodiments.

Figure 2:
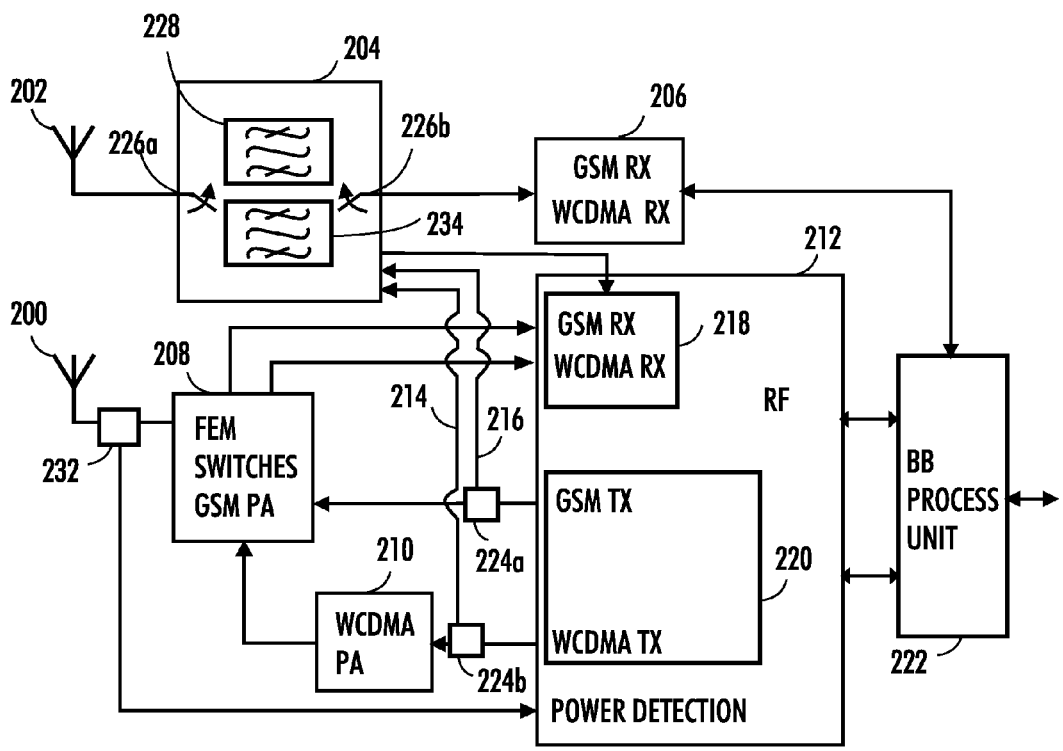
FIGS. 2-11 illustrate simplified examples of transmission and reception parts of an electronic device.

FIG. 2 shows an embodiment illustrating how some of the transmissions can be directed to a second reception antenna. Communications systems may be a GSM and a WCDMA.

An antenna 200 is a reception and transmission antenna. First transmitter RF circuitries 220 are coupled to the antenna 200. A first transmitter which includes, in addition to the RF circuitries, a power amplifier 210 and a connection module 208 may include several individual transmitter paths. It may be called as a Front end module (FEM). The connection module may include RF switches for combining transmission signals from individual transmission paths into one signal. The connection module 208 may also include power amplifies for a GSM transmitter.

The connection module 208 may further divide a signal received by the first antenna 200 to reception signals which are coupled to first receiver 218. Several individual reception paths may exist.

An antenna 202 is a diversity reception antenna. A filter bank element 204 is connected to the diversity reception antenna 202. The filter bank 204 includes at least one, typically two filters, which are shown as blocks 228 and 234. Typically one filter for every reception frequency band is provided. A filter bank may include a bypass path which does not cause substantial attenuation to a signal to be transmitted. Filters are typically band-pass filters as also depicted in the Figure. Several kinds of filters may be used, such as duplex filters.

A control switch 226a may couple the diversity reception antenna to a selected filter. Another switch 226b may couple either a diversity receiver 206 to a selected filter or a signal to be transmitted from the first transmitter to a selected filter by using connections 214 or 216. The switches 226a and 226b are controlled by a signal controlled by a control logic located in a base band signal processing unit 222 (the signal not shown in the Figure).

The diversity receiver 206 is coupled to the filter bank element 204. The diversity receiver 206 may provide several reception RF circuitries and reception paths. The diversity receiver 206 is coupled to the control logic located in a base band signal processing unit 222. Another option is to implement diversity reception functionalities in a first receiver instead of a separate diversity receiver.

A block 232 between the first antenna 200 and the connection block 208 is an optional power detection/monitoring circuitry. This block may be implemented with lumped elements (capacitors, resistors, inductors) or with distributed elements (transmission lines).

A sampled signal to be transmitted may also be routed to another power detection/monitoring circuitry which may be located in block 212. Power detection information is then routed to the control logic located in a base band signal processing unit 222.

A block 210 includes a power amplifier serving WCDMA signals. The power amplifier block 210 may be powered down or partly powered down in order to save current and thus to extend operational time of a device, if a transmission is conveyed to the diversity reception antenna.

A block 212 includes means for power detection and/or power monitoring, and receiver and transmitter radio frequency (RF) parts 218, 220. GSM and WCDMA transmission signals are routed to the block 212 and the GSM and WCDMA reception signals are routed from the block 212 to the control logic located in a base band signal processing unit 222. The block 222 includes signal processing means such as encoding/decoding means and a channel equalizer, etc. These parts are known in the art and thus not explained herein in further detail.

Connection 214 is arranged to convey WCDMA transmission signals to the diversity reception antenna 202 for transmission means and connection 216 is arranged to convey GSM transmission signals to the diversity reception antenna 202 for transmission before the power amplifiers 208, 210.

The divider blocks 224a and 224b are arranged to convey transmission signals from the transmitters located in the block 220 to connections 214 and 216. The divider blocks may be implemented with lumped components or with active components. If the dividers are implemented with active switches, a signal generated by the control logic located in a base band signal processing unit 222 controls the switches (the signal not shown). The dividers may be a fixed ratio divider or an adjustable ratio divider. One possible implementation of the fixed ratio divider is a Wilkinson divider.

A transmission power control algorithm for the first transmitter 220 is typically located in the control logic processor located in a base band signal processing unit 222. This transmission power control algorithm may activate a signal controlling the dividers when transmission power level drops below a threshold determined for transmission power. The threshold may be a fixed value or variable. If it is a fixed value, it may be determined while the device is designed or during manufacturing. If the threshold value varies, it may be adjusted during the operation of the device. Adjustment may be based on a power level of a received signal, frequency of the first receiver 218, power level of a signal to be transmitted, frequency used in the first transmitter, information from the power detection/monitoring circuitry or a combination of any of the listed parameters. Alternatively, the transmission power control algorithm may detect currently used transmission data speed and/or a requested transmission data speed from the network. If required transmission data speed is higher than a predetermined threshold set for a data speed, the power control algorithm may activate a signal generated by the control logic for routing transmissions to the diversity reception antenna.

In an embodiment, the power control algorithm may activate the dividers based on information on several signal characterizing parameters: operational frequency of the transmission/reception of a first transceiver, operational frequency of the transmission/reception of a second transceiver, the power level of a received signal, the quality level of a received signal, used modulation methods, supported Multiple Input-Multiple Output (MIMO) transmission class, harmonic frequencies generated for a radio block, harmonic power level generated from the radio block, timings of the receptions and transmissions of the radio block, and/or a number of subcarriers of a reception and/or transmission.

The parameters or combinations of them may be used as an input for decision making for routing a transmission to a transmission path. Furthermore, the power control algorithm may use information on user terminal's conditions obtained by sensors.

It should be noticed that due to imperfections of physical components some leakage power typically radiates from the first antenna even when transmissions are routed to the diversity reception antenna.

The device may also include one or more sensors for monitoring external or internal conditions of the device. A sensor may monitor the temperature of the device. If the temperature of the device rises too high, transmission power of the device may be decreased due to negative relation between the capacity of a power amplifier and the temperature rise. In such a case, the diversity reception antenna may be converted to act as a transmission antenna. Another option is that a sensor detects the operational mode of the device. For example, the sensor may detect whether a clamshell mobile phone is used in a closed or open position. If several diversity reception antennas are available, this information may be utilized as a basis for transmission antenna selection, the number of subcarriers of a reception and/or transmission. Signal characterizing parameters listed above may be used as an input for decision making for routing a transmission to a transmission path.

The device may also include a battery. The battery provides operational voltage for the device. An indicator may be located between the battery and the base band signal processing unit 222 for indicating the capacity of the battery.

The device may also include additional radio blocks. Each block may be coupled to an antenna of its own. The additional radio blocks typically include radio circuitries, base band processor functionalities and interfaces to other radio blocks. The base band processor functionalities may be divided into several portions, each portion typically designed for the use of one radio block. These portions are typically able to communicate with each other. Information communicated between the radio blocks may include a reception frequency of a radio block, transmission frequency of the radio block, reception signal strength of the radio block, reception signal quality of the radio block, transmission signal level of the radio block, harmonic frequencies generated for the radio block, power levels of harmonics generated from the radio block, and/or timings of the receptions and transmissions of the radio block.

The antennas of different radio modules may radiate interference to each other. The interference may be wideband noise at the operating frequency of another radio block, adjacent channel leakage power to the operating frequency of the radio block, etc. Distances between antennas provide antenna isolation which attenuates signals between the antennas.

In one embodiment, a decision to convey a transmission signal to a second reception antenna may be carried out based on current interference circumstances affecting radio blocks. Conveyance of transmission signals to the second reception antenna may be carried out for maximizing antenna isolation between different radio blocks and thus enabling multiple radio systems to operate simultaneously.

Figure 3:
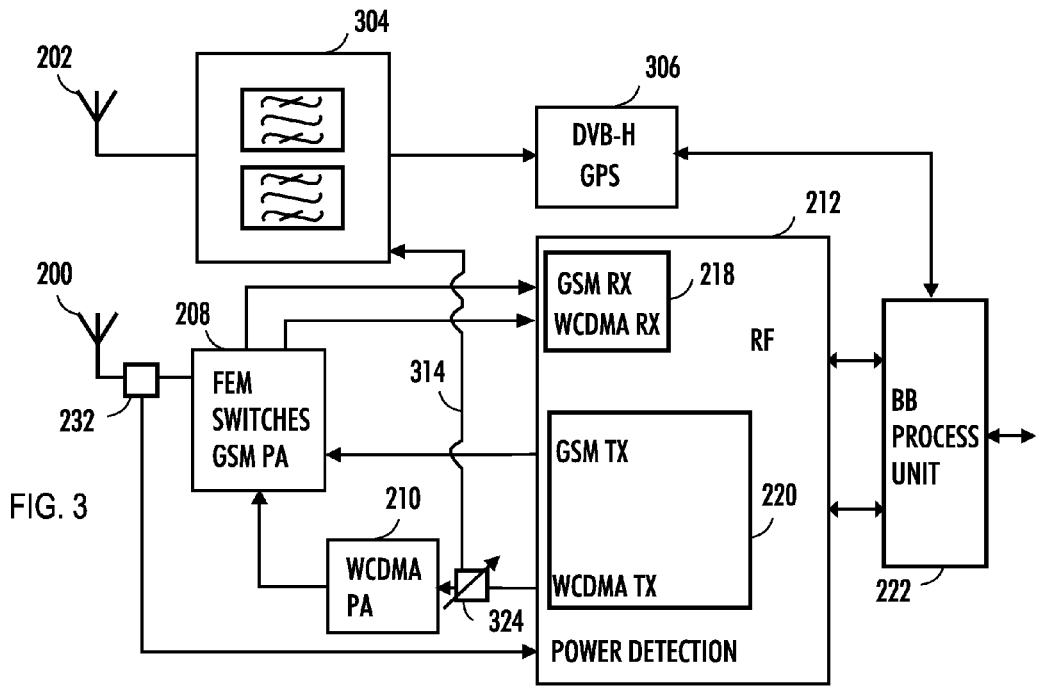

FIG. 3 shows an embodiment illustrating how some of the transmissions can be directed to a diversity reception antenna. Communications systems used in FIG. 3 as examples are a GSM, WCDMA and a Digital Video Broadcasting Handhelds (DVB-H) or Global Positioning System (GPS). In the Figure, WCDMA duplex-filters are not shown for the sake of clarity.

The embodiment is in many aspects similar to the embodiment depicted in FIG. 2. Thus, only main differences are explained herein. A filter bank element 304 is connected to the diversity reception antenna 202. The filter bank 304 includes at least one, typically two filters. Typically one filter for every reception frequency band is provided. If a reception frequency and a transmission frequency bands are overlapping or at least near enough to each other in the frequency domain, one of the filters may operate as a reception filter and a transmission filter. Filters are typically band-pass filters as also depicted in the Figure. Several kinds of filters may be used, such as duplex filters. In the embodiment, the filter bank 304 is a module which has dedicated signal paths for different operational frequencies. Thus there is no need for additional switches, and the linearity and attenuation performance of operation frequencies of the filter bank may be improved.

Common signal paths are paths to be used by a plurality of operational frequencies.

Block 306 is a reception unit for DVB-H or GPS systems. These systems are only taken as examples of large variety of communications systems.

Connection 314 is arranged to convey WCDMA transmission signals to the diversity reception antenna 202 for transmission means before power amplifiers 208, 210.

Divider block 324 is arranged to convey transmission signals from a transmitter located in the block 220 to the connection 314. The divider block 324 may be implemented as a fixed divider or an adjustable divider. The divider block 324 may divide a signal to be transmitted in an adjustable manner.

In some operational conditions, the total power of a signal to be transmitted may be conveyed to a second antenna or a portion of the signal to be transmitted may be conveyed to the second antenna.

An adjustable divider may be implemented with an adjustable Wilkinson power divider for it is able to adjust transmission power between paths. Wilkinson divider is an N-port network used for power splitting and combining (control signals are not shown).

Figure 4:
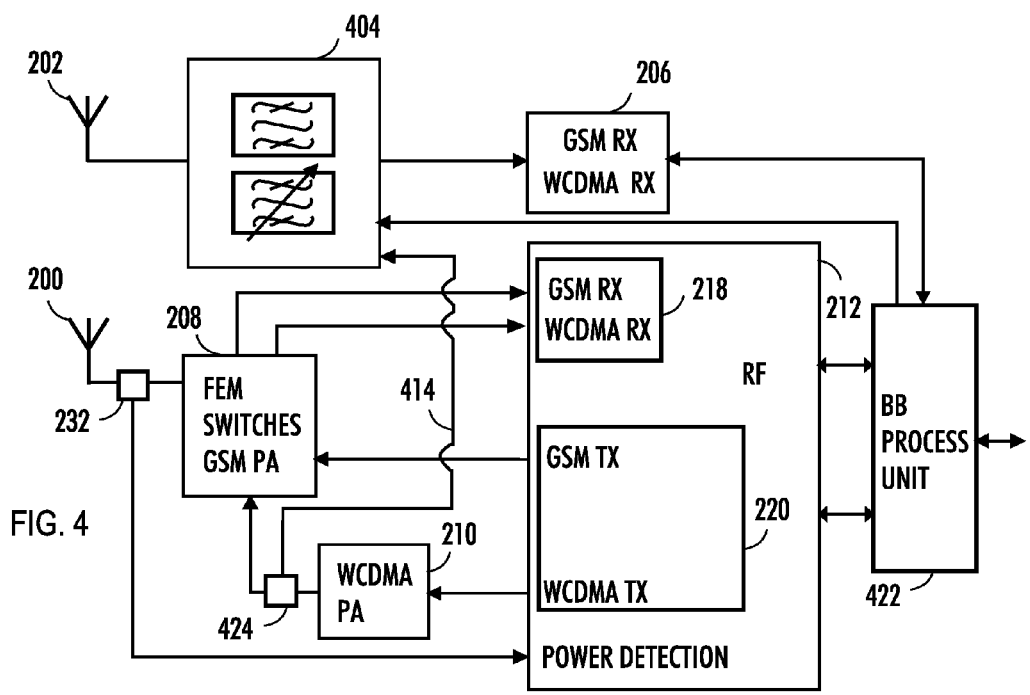

FIG. 4 shows an embodiment illustrating how some of the transmissions can be directed to a second reception antenna. Communications systems used in FIG. 4 as examples are a GSM, WCDMA In the Figure, WCDMA duplex-filters are not shown for the sake of clarity.

The embodiment is in many aspects similar to the embodiment depicted in FIG. 2. Thus, only main differences are explained herein.

A filter bank element 404 is connected to the diversity reception antenna 202. The filter bank 404 includes at least one, typically two filters of which at least one is tunable. Tuning is controlled with a control signal generated in a base band signal processing unit 422. Tuning makes it possible to adjust the characteristics of a filter. Characteristics to be adjusted may be any of the following: insertion band loss at the frequency of the transmission and/or reception, attenuation characteristics of the filter, the filter topology, the order of the filter and the type of the filter.

The characteristics of the antenna to which the transmission is routed and/or its antenna matching may be controlled by using a transmission control algorithm. The algorithm may be a part of a power control algorithm or a separate algorithm placed in a base band signal processing unit 422.

The degree of the tuning may be selected according to the information on a transmission frequency, reception frequency, the power level of a received signal, the power level of a signal to be transmitted, the timing of a received and/or transmitted signal, used modulation, blocking performance of the receiver, expected cross modulation product frequencies or adjacent/alternate channel power of transmission.

One filter for every reception frequency band is typically provided. A filter bank may include a bypass path which does not cause substantial attenuation to a signal to be transmitted or received. Filters are typically band-pass filters as also depicted in the FIG. 4. Several kinds of filters may be used, such as duplex filters.

Connection 414 is arranged to convey WCDMA transmission signals to the diversity reception antenna 202 for transmission means after power amplifiers.

Divider block 424 is arranged to convey transmission signals from a transmitter located in the block 220 to the connection 414. The divider blocks may be implemented with lumped components or with active components. If the dividers are implemented with active switches, a signal generated by the control logic located in a base band signal processing unit 422 controls the switches (the signal not shown). The dividers may be fixed or adjustable ratio dividers.

Figure 5:
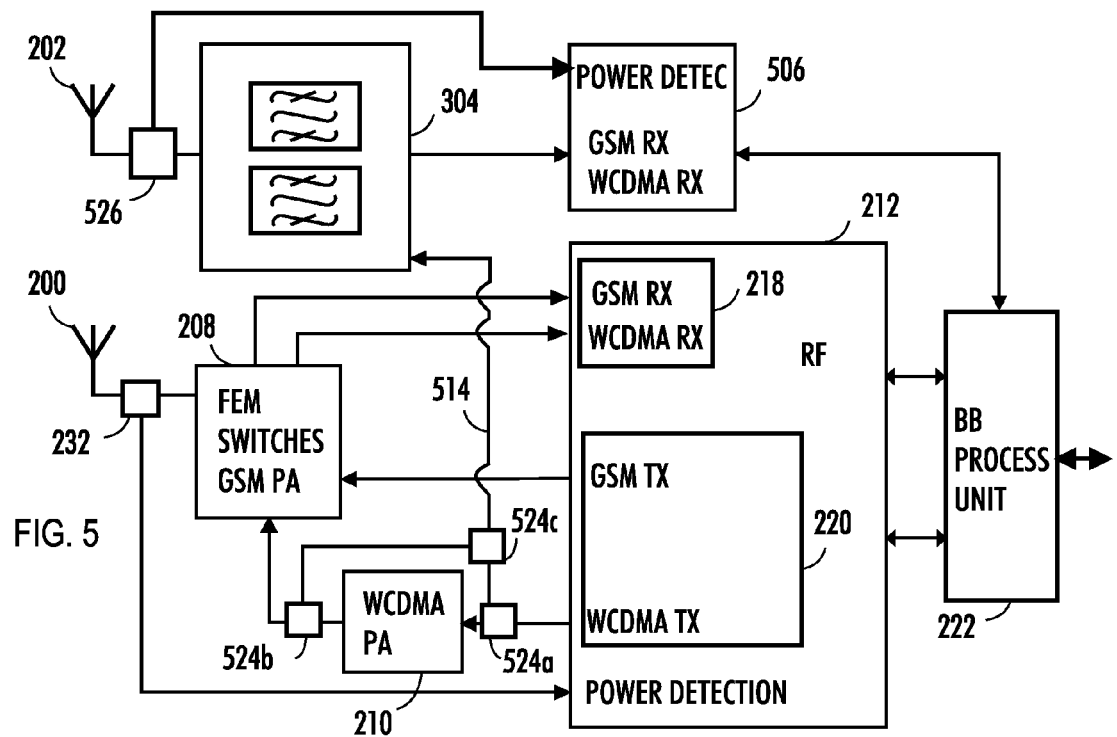

FIG. 5 shows an embodiment illustrating how some of the transmissions can be directed to a diversity reception antenna. Communications systems used in FIG. 5 as examples are a GSM and WCDMA. In the Figure, WCDMA duplex-filters are not shown for the sake of clarity.

The embodiment is in many aspects similar to the embodiment depicted in FIG. 3. Thus, only main differences are explained herein.

A second receiver 506 supports GSM and WCDMA systems. It is coupled to a filter bank element 304. The second receiver 506 may provide several reception RF circuitries and reception paths. The second receiver 506 is also coupled to the control logic located in a base band signal processing unit 222. Another option is to implement diversity reception functionalities in a first receiver instead of a separate diversity receiver.

The second receiver 506 may operate with several reception frequencies and it may support several communication systems. In the second receiver 506 there may be several individual reception RF circuitries and reception paths.

The block 506 may also include a power detection/monitoring means for the diversity reception antenna. A block 526 is a power detection/monitoring circuitry coupled to the power detection means. The power detection circuitry may be implemented with lumped elements (capacitors, resistors, inductors) or with distributed elements (transmission lines.) that are called a coupler.

The information on the power detection may be routed to the control logic 222. A transmission power control algorithm for the transmitter may be embedded in the control logic processor 222. The control may, for instance, be implemented in the following way: the transmission power control algorithm generates a control signal to control divider blocks 524a, 524b and 524c. If a transmission power level drops below a predetermined threshold, the signal to be transmitted may be routed from the block 524a to the block 524c. If the power level is higher than a predetermined threshold and a power control algorithm made a decision to convey the signal to be transmitted to the second antenna, the conveyance of the signals may be carried out from the block 524b to the block 524c. Ratio of division of the transmission power from the first antenna to the second antenna may vary based on control signal generated in the control unit 222. The ratio of division defines a routing ratio. The threshold may be a fixed value or it may vary. The fixed threshold may be determined during designing of the device or during manufacturing. If the threshold varies, it may be altered during the operation of the device based on the received signal level, received signal quality and the frequency of the receiver, the transmission signal level and frequency of the transmitter, or it can be based on the information from the power detection circuitry. Also a combination of different options is possible.

The divider blocks 524a and 524b are arranged to convey transmission signals from the transmitters located in the block 220 to a connection 514. The divider blocks may be implemented with lumped components or with active components. If the dividers are implemented with active switches, a signal generated by the control logic located in a base band signal processing unit 222 controls the switches (the signal not shown). The dividers may be a fixed ratio divider or an adjustable ratio divider. One possible implementation of the fixed ratio divider is a Wilkinson divider.

The divider 524a is arranged to convey signals for the second reception antenna before power amplifiers 210 and the divider 524b is arranged to convey signals for the second reception antenna after the power amplifiers 210.

The divider 524c may select one of the signals from the dividers 524a or 524b to be conveyed to the connection 514. The block 524c may be implemented with one or more active switch components.

Figure 6:
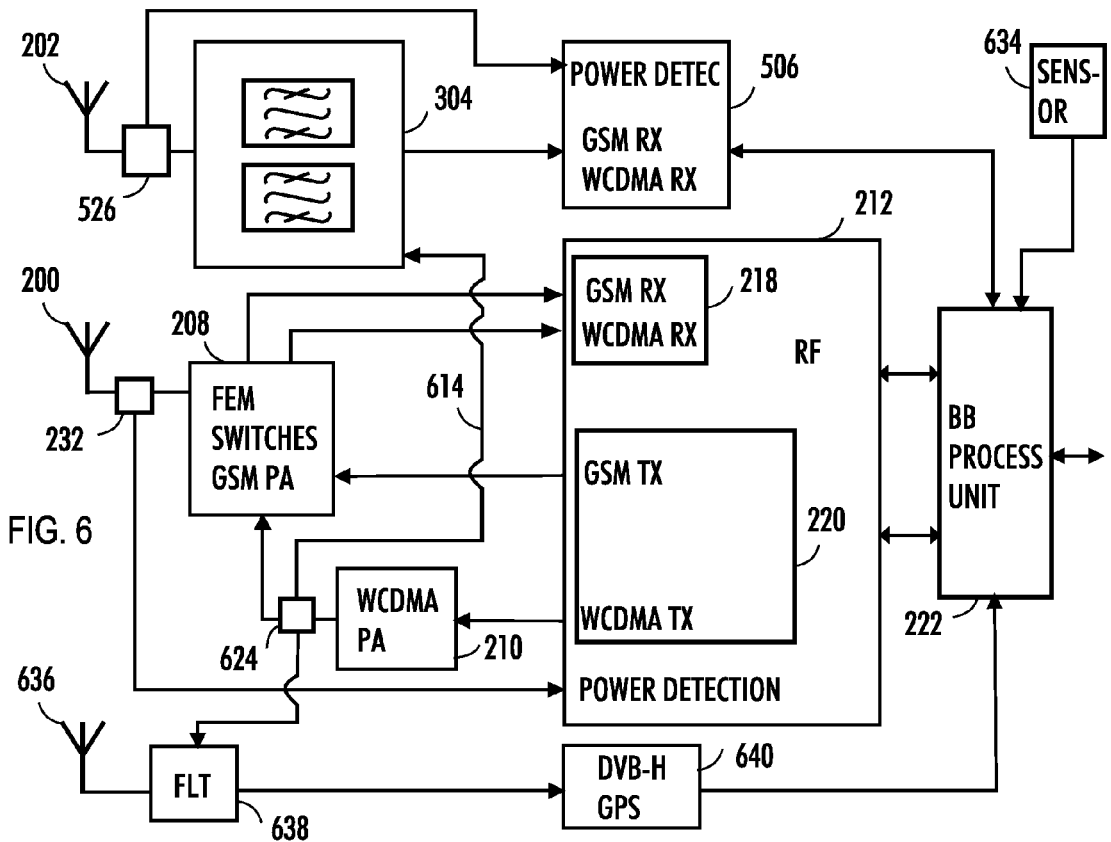

FIG. 6 shows an embodiment illustrating how some of the transmissions can be directed to a second reception antenna. Communications systems used in FIG. 6 as examples are a GSM and WCDMA. In the Figure, WCDMA duplex-filters are not shown for the sake of clarity.

The embodiment is in many aspects similar to the embodiment depicted in FIG. 5. Thus, only main differences are explained herein.

Connection 614 is arranged to convey WCDMA transmission signals to the diversity reception antenna 202 for transmission means after power amplifiers.

Divider block 624 is arranged to convey transmission signals from a transmitter located in the block 220 to the connection 614. The divider blocks may be implemented with lumped components or with active components. If the dividers are implemented with active switches, a signal generated by the control logic located in a base band signal processing unit 222 controls the switches (the signal not shown). The dividers may be fixed or adjustable ratio dividers.

In this embodiment, an electronic device is arranged to detect its operational conditions. This can be based on the information of one or more sensors. A sensor 634 may be, for example, a temperature sensor and/or a proximity sensor. When the temperature inside of the device rises, the transmission power of the device is typically decreased. In such a case, an option is to convert at least one, typically diversity reception antenna to a transmission antenna.

Alternatively, a sensor may detect the operational mode the device is used. An example of an operational mode may be a closed position or open position of a clamshell mobile phone. In some cases the information on the operational mode may be used as a basis for the decision which one of several reception antennas is selected to be a transmission antenna. Other conditions the device may detect are a current battery capacity or voltage, other activated radio units integrated into the device, radio frequency interference from other radios within the device or external to the device.

A transceiver of FIG. 6 also includes another reception antenna 636 to which the divider 624 is able to convey transmissions.

The reception chain includes a filter bank 638. The filter bank includes at least one, typically two filters. Typically one filter for every reception frequency band is provided. Filters are typically band-pass filters as also depicted in the FIG. 6. Several kinds of filters may be used, such as duplex filters.

The reception chain for antenna 636 may also include a diversity receiver for Digital Video Broadcasting Handhelds (DVB-H) or Global Positioning System (GPS) systems as examples of several possible air-interfaces. These receivers are coupled to a base band signal processing unit 222.

Another embodiment for monitoring power level of a conveyed signal is to use some other receiver to measure the power. When the signal to be transmitted is conveyed to the antenna 636, the transmitted signal power may be monitored by using the antenna 202 or antenna 200. The monitoring may be carried out by routing a portion of the signal to the receiver 506 or receiver 218 including a signal strength measurement circuitry for the monitoring. The antenna isolation between the antennas 636 and 202 or 636 and 200 may be determined during manufacturing or at product development phase of the device.

In another embodiment, the transmitted signal power may be monitored by using a receiver 640. The monitoring may be carried out by routing a portion of the signal to the receiver 640 including a signal strength measurement circuitry for the monitoring. This signal strength monitoring by the receiver 640 is typically quite easily carried out, since there tends to be some signal leakage from a combination element 638 to the receiver 640 proportional to signal strength to be transmitted. Alternatively there is some transmission power reflected from the antenna 636 towards the receiver 640 due to antenna mismatch of the antenna 636. The operational mismatch condition of the antenna 636 may be monitored by measuring the reflected power with receiver 640. The information on the mismatch condition may be used as a basis for antenna and antenna circuitry tuning. Antenna matching and antenna tuning are not shown in FIG. 6, but those may be implemented in a similar manner to blocks 728 and 202 in FIG. 7.

Yet another embodiment for monitoring the power level of a conveyed signal is to use another receiver to measure the power. When the signal to be transmitted is conveyed to the antenna 202, the transmitted signal power may be monitored by using the antenna 636. The monitoring may be carried out by routing a portion of the signal to the receiver 640 including a signal strength measurement circuitry for the monitoring.

Figure 7:
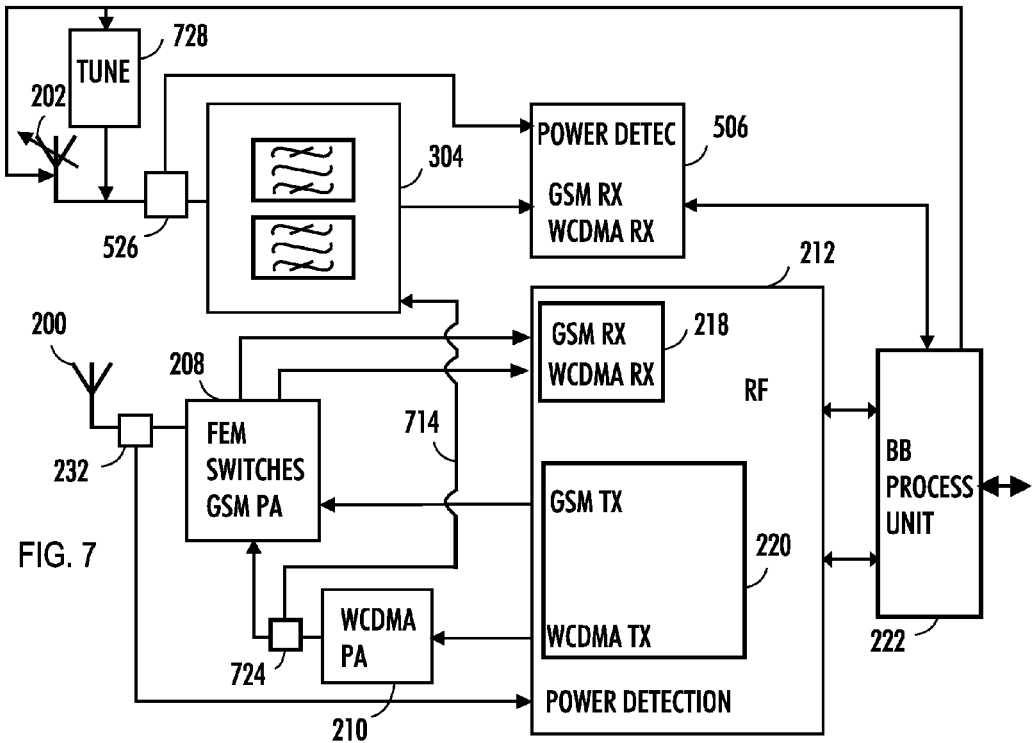

FIG. 7 shows an embodiment illustrating how some of the transmissions can be directed to a second reception antenna. Communications systems used in FIG. 7 as examples are a GSM and WCDMA. In the Figure, WCDMA duplex-filters are not shown for the sake of clarity.

The embodiment is in many aspects similar to the embodiment depicted in FIG. 5. Thus, only main differences are explained herein.

A divider block 724 is arranged to convey transmission signals from the transmitters located in the block 220 to a connection 714. The divider block may be implemented with lumped components or with active components. If the dividers are implemented with active switches, a signal generated by the control logic located in a base band signal processing unit 222 controls the switches (the signal not shown). The dividers may be a fixed ratio divider or an adjustable ratio divider. One possible implementation of the fixed ratio divider is a Wilkinson divider.

An antenna matching tuning block 728 is coupled to the second antenna 202. The antenna matching tuning block 728 may change resonance frequency of the second antenna matching circuitry based on information from the control logic 222. The antenna resonance-tuning signal 202 controls the antenna resonance frequency. The control of the antenna resonance-tuning signal is in turn based on the information from the control logic 222.

The transmission power control algorithm may decide that the original second antenna reception frequency is substantially different than the first transmission frequency, and, in order to optimize the performance of the device, antenna resonance tuning and/or antenna matching tuning is needed.

The antenna tuning may enlarge the antenna resonance bandwidth or tune the antenna resonance near the current center frequency. The antenna matching tuning and the antenna resonance tuning blocks may be implemented, for example, with one or more pin-diodes. The capacitance of a pin-diode is changeable based on a control voltage applied to the pin-diode. When pin-diodes are used as a part of the antenna resonance tuning or matching tuning blocks, the resonance frequency of the circuitry is changeable based on the control voltage applied to a pin-diode. The tuning circuitry may be located in any galvanic antenna connection point.

Figure 8:
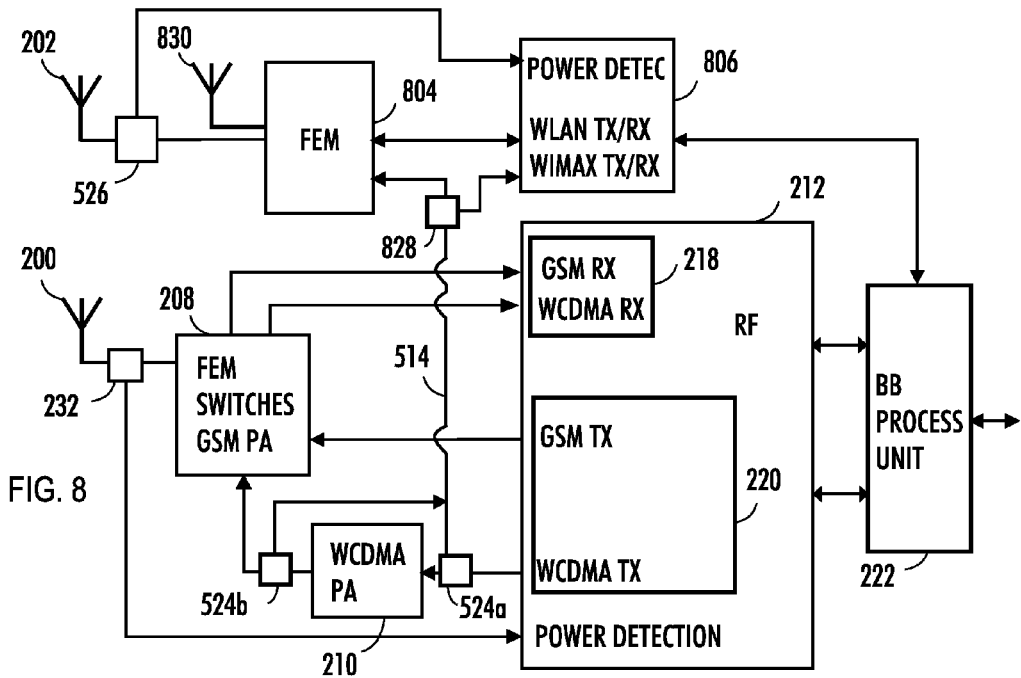

FIG. 8 shows an embodiment illustrating how some of the transmissions can be directed to a second reception antenna. Communications systems used in FIG. 8 as examples are a GSM, WCDMA, Wireless Local Area network (WLAN) and Wireless Metropolitan Area Network (WiMAX). In the Figure, WCDMA duplex-filters are not shown for the sake of clarity.

The embodiment is in many aspects similar to the embodiment depicted in FIG. 5. Thus, only main differences are explained herein.

A second transceiver 806 may support WLAN and/or WiMAX systems. Both systems are bi-directional radio systems that receive and transmit information from antenna. The block 806 is coupled to a front-end module 804. A front-end module typically includes filters and power amplifiers.

The second transceiver 806 may provide several reception and transmission RF circuitries and reception paths. The second transceiver 806 is also coupled to the control logic located in a base band signal processing unit 222.

The second transceiver 806 may operate with several reception and/or transmission frequencies and it may support several communication systems. A diversity antenna 830 is shown in FIG. 8. This diversity antenna may be used for diversity reception or transmission of the transceiver 806. A signal conveyed from the path 514 may be routed to a plurality of destinations by a divider block 828.

The divider block 828 is arranged to convey transmission signals from the transmitters located in block 220 to the front-end module 804 or to the transceivers in block 806 A decision where the signal from the path 514 will be routed to may be carried out by a power control algorithm located in the processing unit 222. The grounds for the decision may be based on the power level of a signal to be transmitted, operational frequency of the transmission/reception of the first transceiver, operational frequency of the transmission/reception of the second transceiver, the power level of a received signal, the quality level of a received signal, used modulation methods, supported Multiple Input-Multiple Output (MIMO) transmission class or any combination of the listed parameters. Furthermore, the power control algorithm may use information on the user terminal's conditions obtained by sensors.

In an alternative embodiment, a signal to be transmitted by the transmitter 220 is routed to transmitters of the block 806. Since the transmitters of the block 806 may have multiple gain stages, the signal to be transmitted may be amplified or attenuated by the block 806. Thus the block 806 may control the power level of the signal to be transmitted without power control from block 220. In the case the power control is carried out independently to signals transmitted from the antennas 200 and 202, the performance of the system can be optimized as a whole. Several inputs for routing signals to be transmitted may be provided in the block 806. The power control algorithm which controls power level of the transmitter 220, may also control transmission circuitries of the block 806.

Figure 9:
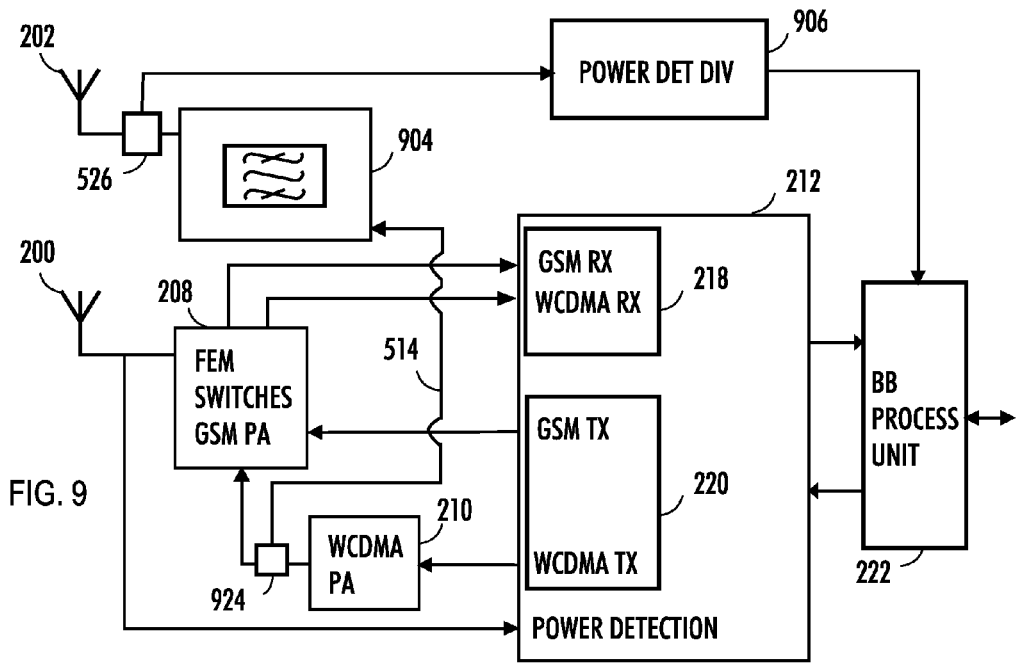

FIG. 9 shows an embodiment illustrating how some of the transmissions can be directed to a second antenna. Communications systems used in FIG. 9 as examples are a GSM and WCDMA. In the Figure, WCDMA duplex-filters are not shown for the sake of clarity.

The embodiment is in many aspects similar to the embodiment depicted in FIG. 5. Thus, only main differences are explained herein.

A filter block 904 may include at least one, typically two filters. At least ones of the filters is arranged to be a reception filter and at least one filter which is arranged to be a transmission filter. If the reception frequency and the transmission frequency bands are overlapping or they are near enough each other in the frequency domain, one of the filters may operate as a reception filter and a transmission filter. These filters may be combined into a duplex-filter. The Filter is typically a band-pass filter as also depicted in the FIG. 9.

A block 906 includes power detection means for the diversity reception antenna. The power detection block 526 may be implemented with lumped elements (capacitors, resistors, inductors) or with distributed elements (transmission lines). The power detection block 906 includes an active circuitry which is needed to extract power information on the transmission.

If receiver functionality is disabled, for example for power saving purposes, from the block 506 in FIG. 5, the arrangement of FIG. 5 will be similar to the arrangement presented in FIG. 9.

Figure 10:
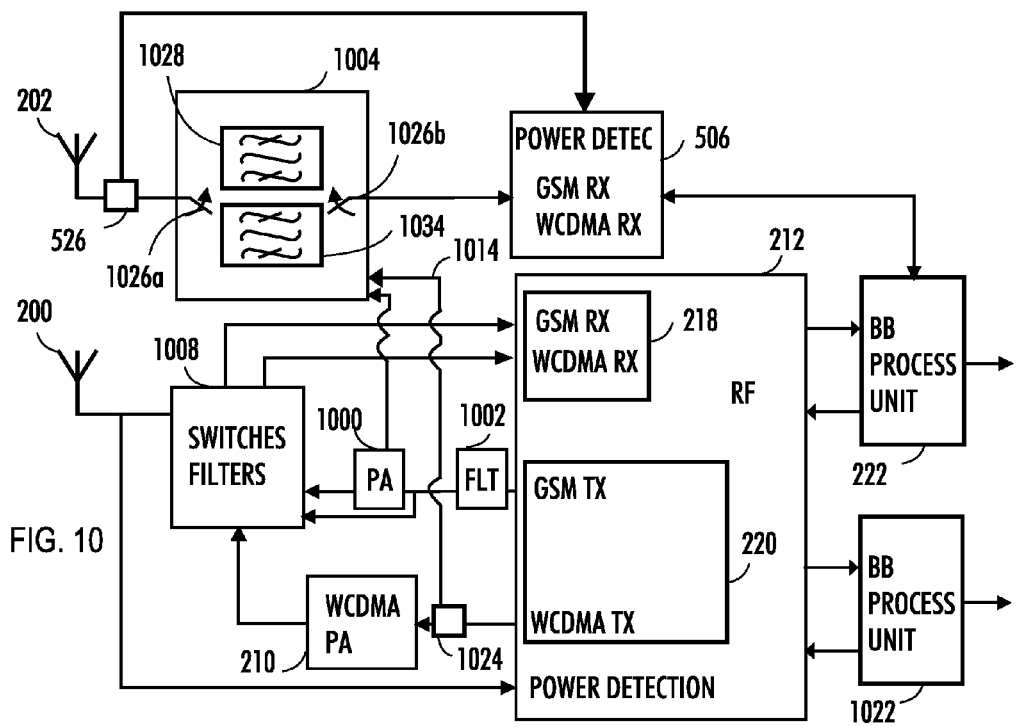

FIG. 10 shows an embodiment illustrating how some of the transmissions can be directed to a second reception antenna. Communications systems used in FIG. 10 as examples are a GSM and WCDMA. In the Figure, WCDMA duplex-filters are not shown for the sake of clarity. Bypassing arrangement for GSM transmissions is not shown for the sake of clarity.

The embodiment is in many aspects similar to the embodiment depicted in FIG. 5. Thus, only main differences are explained herein.

An antenna 202 is a diversity reception antenna. A filter bank element 1004 is connected to the diversity reception antenna 202. The filter bank 1004 includes at least one, typically two filters, which are shown as blocks 1028 and 1034. Typically, one filter for every reception frequency band is provided. A filter bank may include a bypass path which does not cause substantial attenuation to a signal to be transmitted. If a reception frequency is overlapping with a transmission frequency or they are near enough, one of the filters may operate as a reception filter and a transmission filter. Filters are typically band-pass filters as also depicted in the FIG. 10. Several kinds of filters may be used, such as duplex filters.

A control switch 1026a may couple the diversity reception antenna to a selected filter. Another switch 1026b may couple either a diversity receiver 506 to a selected filter or a signal to be transmitted from the first transmitter to a selected filter by using a connection 1014. The switches 1026a and 1026b are controlled by a signal controlled by a control logic located in a base band signal processing unit 222 (the signal not shown in the Figure).

A divider block 1024 is arranged to convey transmission signals from the transmitters located in the block 220 to the connection 1024. The divider block may be implemented with lumped components or with active components. If the divider is implemented with active switches, a signal generated by the control logic located in a base band signal processing unit 1022 controls the switches (the signal not shown). The divider may be a fixed ratio divider or an adjustable ratio divider. One possible implementation of the fixed ratio divider is a Wilkinson divider.

The transmitter 220 may operate at multiple frequencies or serve multiple modulation methods. Several individual transmitter chains for transmitting signals at different frequencies and modulated by different modulation methods may be provided. Since currently used radio systems include transmission power control, power control circuitry is typically included in transmitters.

Connection module 1008 may include several individual transmitter and/or reception paths. The connection module may include RF switches for combining transmission signals from individual transmission paths into one signal. The connection module may also include transmission and/or reception filters.

The second transmitter chain of the transmitter 220 is presented more in details in connection to FIG. 10. The block 1002 shows a filter block which may be needed for filtering out out-of-band noise. The block 1000 is a power amplifier including several transmission gain stages for a signal to be transmitted. For the conveyance exist multiple connection points. The selection of a connection point may be carried out by using a power control algorithm located in the processor block 1022. In some operational conditions, it is possible to by-pass the power amplifier module block 1000. This kind of situation may occur when the transmitter is transmitting at a low power level that is when a signal conveyance is not needed. In this case, operational current consumption may be decreased.

Figure 11:
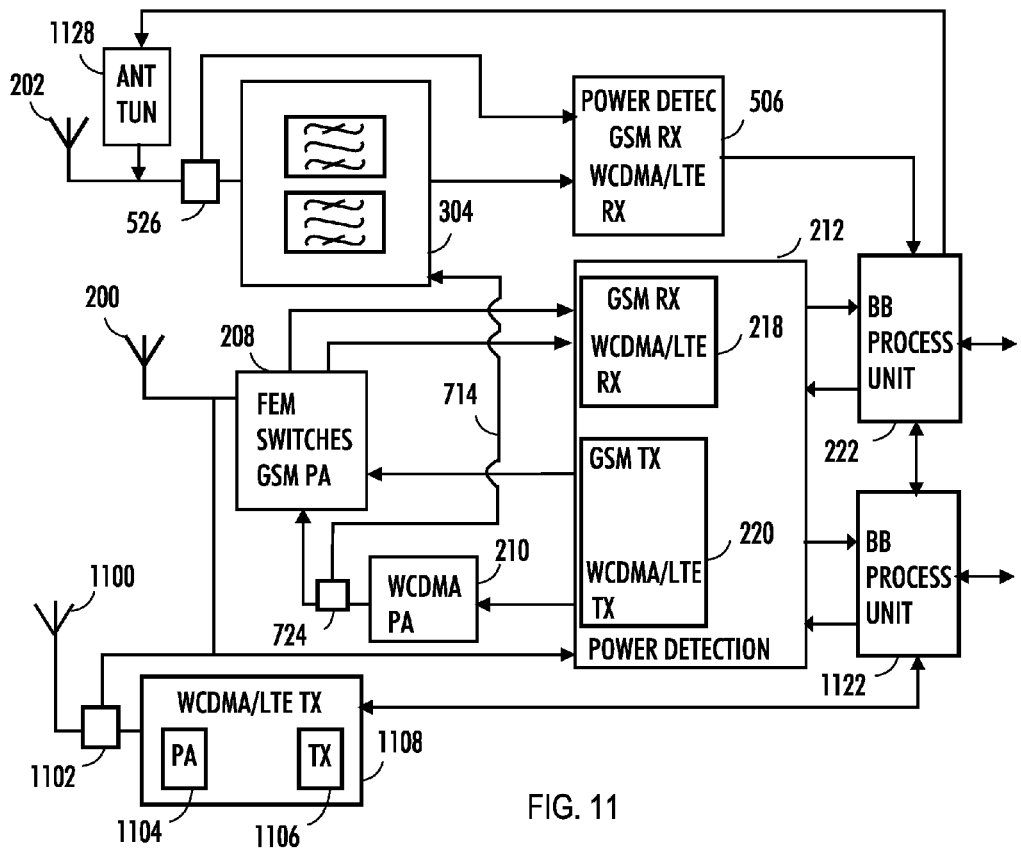

FIG. 11 shows an embodiment illustrating how some of the transmissions can be directed to a second reception antenna. Communications systems used in FIG. 11 as examples are a GSM and WCDMA. In the Figure, WCDMA duplex-filters are not shown for the sake of clarity. Bypassing arrangement for GSM transmissions is not shown for the sake of clarity.

The embodiment is in many aspects similar to the embodiment depicted in FIG. 7. Thus, only main differences are explained herein.

An antenna tuning block 1128 is connected to the second antenna 202. The antenna tuning block 1128 may change the second antenna resonance frequency and matching based on the information from the control logic 222 and/or 1122. The same antenna tuning information may also be obtainable from other units. The transmission power control algorithm may decide that the original second antenna reception frequency is substantially different than the first transmission frequency, and, in order to optimize the performance of the device, antenna resonance tuning is needed. The antenna tuning may enlarge the antenna resonance bandwidth or tune the antenna resonance near the current center frequency. The antenna tuning block may be implemented, for example, with one or more pin-diodes the capacitance of which is changeable based on the control voltage applied to the pin-diode. When pin-diodes are used as a part of the antenna tuning block, the resonance frequency of the circuitry is changeable based on the control voltage of a pin-diode.

It should be noticed that transmission data rate may also be a basis for decision on antenna to which signals are conveyed for transmission. For instance, signals having a data rate higher than a threshold are conveyed to a second reception antenna for transmission. Another option is that the decision may be made based on at least one of the following: supported communication systems, used transmission modulations, operational transmission frequencies, transmission power levels, harmonic frequencies generated by transmissions, harmonic power levels generated by transmissions and a number of sub-carriers of transmissions.

A second transmitter 1108 enables diversity transmission of a WCDMA/LTE user device. The second transmitter may be coupled to the second control logic 1122. In a case the second receiver 506 is coupled with the second transmitter, the device is capable to serve Multiple-Input-Multiple-Output (MIMO) systems. A device supporting uplink/downlink MIMO-systems includes at least two antennas. Thus, the second transmitter 1108 includes a second power amplifier block 1104 and a second RF transmitter block 1106.

The second transmitter is coupled to a third antenna 1100. The third antenna may be a separate antenna element or, alternatively, antenna functionality may be implemented as a shared antenna with the second antenna. The block 1102 includes a power detection circuitry. The power detection circuitry may be coupled with the first transmitter or the second transmitter. Information of the power detection of the second transmitter may be used for power control for which an algorithm may be located in the first control logic 222 or in the second control logic 1122. The second transmitter functionality may also be implemented in the first transmitter.

Figure 12:
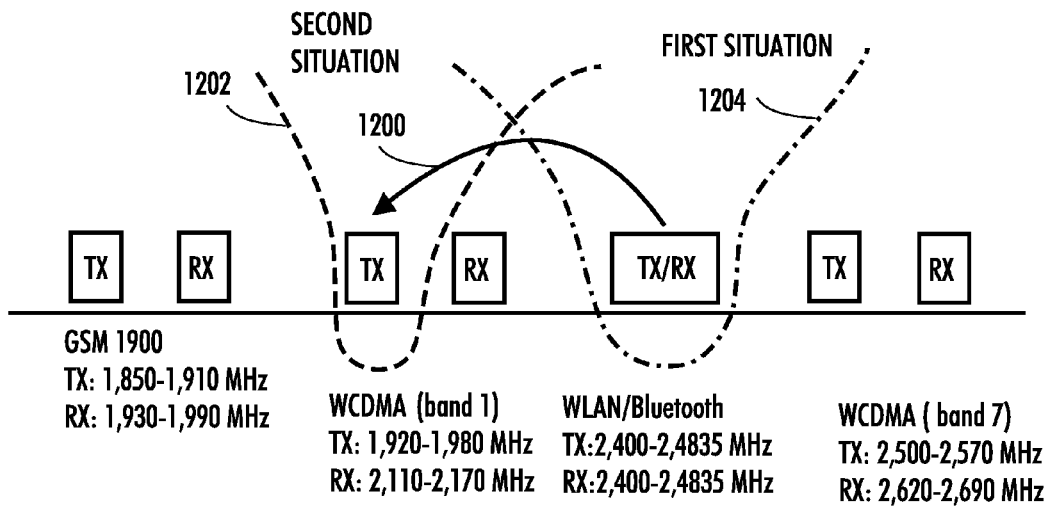
FIGS. 12 and 13 are frequency domain illustrations depicting examples of how different communications systems can be supported.

FIG. 12 is a frequency domain illustration depicting one example of how different communications systems can be supported. The systems of the FIG. 12 are only used as examples, they do not limit implementations of embodiments.

The arrow 1200 illustrates one possibility to tune a reception antenna's center resonance frequency to support transmissions.

A line 1204 shows the antenna resonance of a diversity reception antenna when the antenna is operating as a reception and/or transmission antenna. A line 1202 shows how antenna can be tuned to a second frequency band (a transmission band) to better support its use for transmissions.

Figure 13:
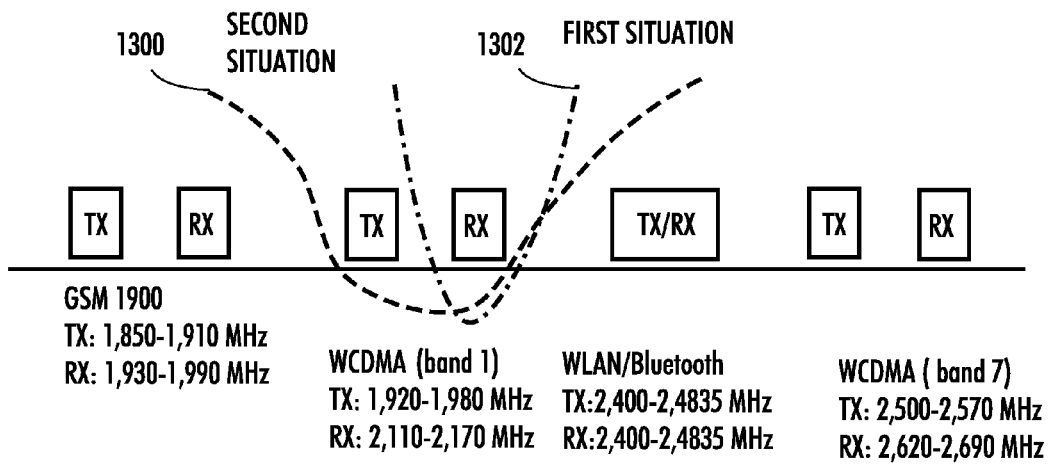

FIG. 13 is another frequency domain illustration showing an example of systems a first and a second receiver, and a transmitter are able to support. The systems of the FIG. 13 are only used as examples, they do not limit implementations of embodiments.

A line 1302 shows the antenna resonance of s reception antenna when the antenna is operating as a diversity reception antenna only. A line 1300 shows how antenna can be tuned to resonate in a wider frequency band to better support its use for transmissions.

Figure 14:
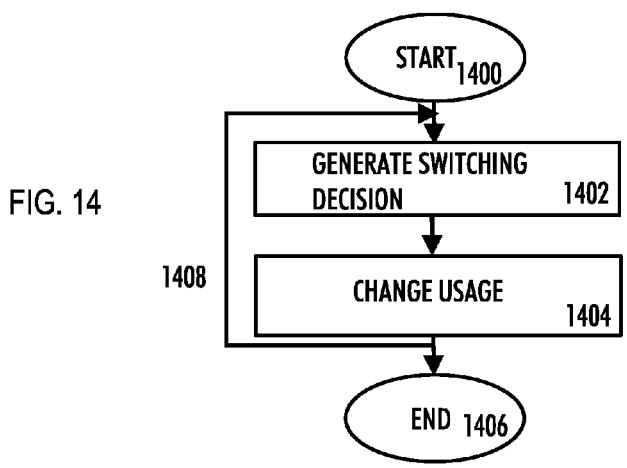
FIG. 14 is a flow chart.

FIG. 14 is a flow chart depicting an embodiment of a method for making antenna usage more efficient. The embodiment begins in block 1400.

In block 1402, a switching decision is generated for changing usage of at least one antenna from reception to transmission by a control logic.

In block 1404, usage of at least one antenna is changed responsive to the generated switching decision by the control logic.

In another embodiment, signal characterizing parameters of a transmission are defined and the transmission is routed to at least one transmission path based on the signal characterizing parameters, the at least one transmission path arranged to convey the transmission to at least one antenna.

Alternatively, an apparatus may communicate a change of an operational mode to another end. The operational mode may for instance be a supported Multiple Input-Multiple Output (MIMO) transmission class. The communication may also include timing information relating to the change of the operational mode.

A user terminal may communicate parameters to a second end of the communication. The second end of the communication may be a network element or a user terminal, if user terminals may communicate directly to each other. Alternatively, the user terminal may communicate to the second end of the communication that a new transmission antenna or a transmission path will be used after predetermined period of time. Thus the second end of the communication can be informed before a transmission path change that characteristics of a transmission channel seen by the second end of the communication are going to be changed.

The parameters may be communicated before the transmission antenna or path change or a part of the change.

The embodiment ends in block 1406. Arrow 1408 depicts one possibility to repeat the embodiment.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus comprising:
   a power detection circuitry configured to monitor a transmission power of at least a first antenna, wherein a first route is configured to route a signal to a power amplifier and then to the first antenna, and the first antenna is configured to transmit the signal; and
   a control logic configured to make a switching decision to switch at least a second antenna from reception to transmission based at least in part on the transmission power not exceeding a threshold, wherein the control logic is further configured to change usage of at least the second antenna in response to the switching decision, a second route is configured to route the signal to bypass the power amplifier by routing the signal toward the second antenna before the signal reaches the power amplifier, and the second antenna is configured to transmit the signal.

2. The apparatus of claim 1, wherein the switching decision by the control logic is based at least in part on signal characterizing parameters.

3. The apparatus of claim 2, wherein the signal characterizing parameters are at least one of the following:
   operational frequency of the transmission or reception of a first transceiver,
   operational frequency of the transmission or reception of a second transceiver,
   power level of a received signal,
   used modulation methods,
   supported Multiple Input-Multiple Output transmission class,
   harmonic frequencies generated for a radio block,
   harmonic power level generated from a radio block,
   timings of the receptions and transmissions of a radio block, and
   a number of sub-carriers of a reception or transmission.

4. The apparatus of claim 1, wherein the control logic is further configured to change the usage of a predetermined antenna to reception and transmission.

5. The apparatus of claim 1, wherein the control logic is further configured to change the usage of at least one element of a diversity reception antenna from reception to transmission.

6. The apparatus of claim 1, wherein the control logic is further configured to change the usage of a reception antenna serving a first radio system to a transmission antenna serving a second radio system.

7. The apparatus of claim 1, further comprising:
   an antenna matching tuning block configured to change a resonance frequency of an antenna whose usage is changed.

8. The apparatus of claim 1, wherein the control logic comprises a power control algorithm and is further configured to make the switching decision based on at least one of the following parameters:
   a power level of a transmission,
   data rate of a signal to be transmitted,
   frequency of a transmission,
   used modulation of a transmission,
   a number of sub-carriers of a transmission or reception,
   information from the power detection or monitoring circuitry,
   frequency of a reception,
   strength of a reception signal,
   received signal quality,
   received signal data rate,
   modulation of reception,
   harmonic frequencies generated by a transmission,
   harmonic power levels generated by a transmission,
   timing of a reception and
   timing of a transmission.

9. A method comprising:
   monitoring a transmission power of at least a first antenna, wherein a first route routes a signal to a power amplifier and then to the first antenna, and the first antenna transmits the signal;
   generating a switching decision to switch at least a second antenna from reception to transmission based at least in part on the transmission power not exceeding a threshold; and
   changing usage of at least the second antenna responsive to the generated switching decision, wherein a second route routes the signal to bypass the power amplifier by routing the signal toward the second antenna before the signal reaches the power amplifier, and the second antenna transmits the signal.

10. The method of claim 9, further comprising:
    generating the switching decision based on signal characterizing parameters.

11. The method of claim 10, wherein the signal characterizing parameters are at least one of the following:
    operational frequency of the transmission or reception of a first transceiver,
    operational frequency of the transmission or reception of a second transceiver,
    power level of a received signal,
    quality level of a received signal,
    power level of a transmitted signal used quality level of a received signal, power level of a transmitted signal modulation methods,
    supported Multiple Input-Multiple Output transmission class,
    harmonic frequencies generated for a radio block,
    harmonic power level generated from a radio block,
    timings of the receptions and transmissions of a radio block, and
    a number of sub-carriers of a reception or transmission.

12. The method of claim 9, further comprising:
    changing the usage of a predetermined antenna to reception and transmission.

13. The method of claim 9, further comprising:
    changing the usage of at least one element of a diversity reception antenna from reception to transmission.

14. The method of claim 9, further comprising:
changing the usage of a reception antenna serving a first radio system to a transmission antenna serving a second radio system.

15. The method of claim 9, further comprising:
changing a resonance frequency of an antenna whose usage is changed by an antenna matching tuning block.

16. The method of claim 9, further comprising: making the switching decision based on a power control algorithm and at least one of the following parameters:
a power level of a transmission,
data rate of a signal to be transmitted,
frequency of a transmission,
used modulation of a transmission,
a number of sub-carriers of a transmission or reception,
information from the power detection or monitoring circuitry,
frequency of a reception,
strength of a reception signal,
received signal quality,
received signal data rate,
modulation of reception,
harmonic frequencies generated by a transmission,
harmonic power levels generated by a transmission,
timing of a reception and timing of a transmission.

17. A control logic processor comprising circuitry configured:
to monitor a transmission power of at least a first antenna, wherein a first route is configured to route a signal to a power amplifier and then to the first antenna, and the first antenna is configured to transmit the signal;
to generate a switching decision to switch at least a second antenna from reception to transmission based at least in part on the transmission power not exceeding a threshold; and
to change usage of at least the second antenna responsive to the generated switching decision, wherein a second route is configured to route the signal to bypass the power amplifier by routing the signal toward the second antenna before the signal reaches the power amplifier, and the second antenna is configured to transmit the signal.

* * * * *